United States Patent [19]
Van Damme et al.

[11] Patent Number: 5,656,410
[45] Date of Patent: *Aug. 12, 1997

[54] PROCESS FOR PRODUCING A PROTECTED HEAT-MODE RECORDING MATERIAL

[75] Inventors: Marc Van Damme, Heverlee; Luc Leenders, Herentals; Yvan Hoogmartens, Wilrijk; Dirk D'hont, Mortsel, all of Belgium

[73] Assignee: Agfa-Gevaert N.V., Mortsel, Belgium

[*] Notice: The term of this patent shall not extend beyond the expiration date of Pat. No. 5,558,972.

[21] Appl. No.: 442,829

[22] Filed: May 17, 1995

[30] Foreign Application Priority Data

Jun. 15, 1994 [EP] European Pat. Off. ............. 94201713

[51] Int. Cl.$^6$ ............................................. G03C 11/12
[52] U.S. Cl. .................. 430/256; 430/270.1; 156/238; 156/239; 156/324; 156/382
[58] Field of Search ........................ 430/256, 271.1, 430/330; 156/238, 241, 382, 239, 324

[56] References Cited

U.S. PATENT DOCUMENTS

| | | |
|---|---|---|
| 4,069,487 | 1/1978 | Kasai et al. ............................ 346/76 |
| 4,388,400 | 6/1983 | Tabai et al. ............................ 430/346 |
| 4,499,178 | 2/1985 | Wada et al. ............................ 430/495 |
| 4,983,505 | 1/1991 | Higuchi et al. ....................... 430/495 |
| 5,147,490 | 9/1992 | Leendens et al. .................... 456/238 |
| 5,238,723 | 8/1993 | Yoshizawa et al. .................. 478/64 |

FOREIGN PATENT DOCUMENTS 0586990  3/1994  European Pat. Off. .

Primary Examiner—Thorl Chea
Attorney, Agent, or Firm—Brumbaugh, Graves, Donohue & Raymond

[57] ABSTRACT

A process for the production of a heat-mode recording material having "direct read after write" (DRAW) capability and containing a heat-mode recording layer on a permanent support, wherein said process comprises in consecutive order the steps of (1) forming a laminated web by laminating with heat and pressure to said recording layer a single adhesive layer or multiple layer assemblage carried by a web-type temporary support which layer or layer assemblage has a thickness not larger than 20 μm, and (2) separating said temporary support from said adhesive layer leaving said single adhesive layer through hardening as a protective element on said recording layer, or (2') separating said temporary support from said adhesive layer assemblage leaving said layer assemblage as a protective element on said recording layer through hardening of at least the outermost layer of the transferred layer assemblage.

17 Claims, 2 Drawing Sheets

PROCESS FOR PRODUCING A PROTECTED HEAT-MODE RECORDING MATERIAL

DESCRIPTION

1. Field of the Invention

The present invention relates to a processs for the production of a heat-mode recording material having "direct read after write" (DRAW) capability and to a material suited for DRAW.

2. Background of the Invention

Almost all of the known DRAW recording materials are characterized by a heat-mode recording layer, i.e. a layer wherein the recording proceeds by absorption of light causing an intense heating which results in a human readable or machine readable mark.

In common heat-mode DRAW recording materials a thin recording layer of relatively low melting metals, their alloys or dyes is present on a support. Such layers are strictly not light-sensitive but are responsive to the thermal energy set free by the absorption of a high-intensity, short duration pulse of laser light. The writing spot ablates or melts a small amount of the thermo-sensitive layer which in the heated area by surface tension contracts and shows a small crater or hole.

DRAW recording materials can be used as a medium for recording an imagewise modulated laser beam to produce a human readable or machine readable record or optical mask serving as intermediate image, also called phototool, in contact-exposure of a photo-resist layer that may be applied in the production of printed circuits.

Human readable records are e.g. micro-images that can be read on enlargement and projection. An example thereof is computer output microfilm (COM) on a transparent support. Computer output microfilm images can be read by optical enlargement in a reader on projecting light through the COM record. The enlarged micro-film image can be copied on a suitable recording element such as diazo film or a silver halide emulsion material. Hard copies of the enlarged images can be obtained in a reader-printer by techniques known e.g. from the electrophotographic art.

An example of a machine readable DRAW recording material is the optical disk. To date for the production of optical disks tellurium and tellurium alloys have been used most widely to form highly reflective thin metal films wherein heating with laser beam locally reduces reflectivity by pit formation (ref. e.g. the periodical Physik in unserer Zeit, 15. Jahrg. 1984/Nr. 5, 129–130 under the heading "Optische Datenspeicher" by Jochen Fricke). Tellurium is toxic and has poor archival properties because of its sensitivity to oxygen and humidity. Therefore, the recording layers containing tellurium are airtightly protected to achieve an acceptable archival life.

To avoid the toxicity problem other relatively low melting metals such as Sn and Bi have been introduced in the production of a heat-mode recording layer. A survey of other metals also suited for use in DRAW heat-mode recording is given in U.S. Pat. Nos. 4,499,178 and 4,388,400.

Metal layers have a relatively high reflectivity so that by their ablation in heat-mode recording spots of lower reflectivity are obtained.

According to another embodiment an increase in transmission is obtained in laser beam heated areas by using an initially poor reflective heat-mode recording layer on a transparent support which layer becomes ablated in the areas struck by laser beam. Such layer intended for COM-production and being made of co-deposited low melting point metals and sulphides such as GeS or SnS on a transparent support is described e.g. in Journal of Applied Photographic Engineering, Vol. 9, No. 1, February, 1983, p. 12. For the production of optical disks wherein the information is read in the reflection mode said poor reflective heat-mode recording layer is applied onto a relatively high melting reflective support or layer, e.g. aluminium or graphite layer, carried by a support.

In a further embodiment heat-mode recording is carried out with binderless organic dye layers as described e.g. in the periodical Philips Techn. T. 41, p. 338–346 by D. J. Gravesteijn and J. van der Veen.

Thin (normally less than 0.1 micron thick) layers of metals, alloys or dyes suited for heat-mode recording are produced advantageously by vacuum-deposition. These thin vacuum-deposited layers are mechanically weak and require the application of a protective coating. Electroplating is another method suited for depositing a thin metal layer, but needs a conductive support or interlayer, e.g. a transparent indium-tin oxide coating (NESA coating) applied on polyester support or glass.

The protective coating having a mechanical function in protecting the recording layer against direct abrasive contact with other materials has in optical disks also an optical function in that it keeps possible dirt out of focus in the optical playback of the information.

The protection of the mechanically vulnerable recording layer has been done by two approaches. In a first approach two recording layers on separate supports are assembled into a sandwich, with their supports facing out and having inbetween a space which can be filled with a chemically inert gas. In a second approach the recording surface is coated with a transparent material acting as protective overcoat (see IEEE Spectrum August 1978, pages 22 and 23 and particularly FIG. 2A and 2B).

According to U.S. Pat. Nos. 4,499,178 and 4,388,400 for obtaining a heat-mode recording material having increased sensitivity, durability and mechanical strength it is effective to use organic resins in the production of a protective layer. Various resins can be used to form a protective layer, such as styrene resins, vinyl acetate resins, methacrylic acid ester resins, amide resins, cellulosic resins, halogenated polyolefins, phenolic resins, soluble polyesters, etc.

These resins are dissolved in a wide variety of solvents and spread by any known method onto the recording layer, whereupon the solvent is evaporated. The thickness of the protective layer varies with the film strength, and required recording density. Normally the thickness is in the range of 0.01 to 5 μm (micron).

The coating or spraying of a protective layer from a dissolved resin does not proceed inside the vacuum chamber used for the vacuum deposition of the heat-mode recording layer. After a web-type support has been vacuum-coated with the heat-mode recording layer it is wound on a take-up roller in the vacuum chamber, whereupon it is taken therefrom to the coating station in atmospheric conditions for unwinding and coating of the web with dissolved resin or resin mixture.

As explained in U.S. Pat. No. 5,147,490 the winding and unwinding of a web having a freshly vacuum-coated heat-mode recording layer gives rise to the problem of producing optical defects such as pin-holes in the recording layer since sliding-friction unavoidable in said operation causes damages to the recording layer by abrasion and formation of dust even when the winding and unwinding operations are kept under control. Pin-holes and all kinds of micro-scratches are particularly undesirable in recording materials for producing micro-images.

According to the process for the production of a heat-mode recording material claimed in U.S. Pat. No. 5,147,490 said problem has been solved by laminating a protective organic resin layer in web form onto the supported "direct read after write" (DRAW) recording layer by means of an adhesive layer while said supported recording layer remains within the sealed zone and under the same vacuum conditions wherein the recording layer has been applied.

In practice the combined total thickness of said protective organic resin layer and adhesive layer is for wrinkleless application not less than 20 µm which thickness in using the final DRAW print as a mask, i.e. phototool, in the contact-exposure of a photosensitive member, e.g. photoresist layer, gives rise to a certain loss in image resolution which will be due not only to the exposure distance created by said thickness but also by reflection and diffraction of light in the laminated layers.

It is one of the objects of the present invention to provide a process for the production of a heat-mode recording material having "direct read after write" (DRAW) possibilities wherein a non-imaged heat-mode recording layer of said material is protected with a protective layer or layer assemblage being sufficiently thin for making the thereupon heat-mode imaged recording material particularly suited for use as phototool in the contact-exposure of photosensitive materials thereby yielding improved print resolution.

It is a particular object of the present invention to provide a direct read after write (DRAW) recording material having a heat-mode recording layer coated with a highly scratch-resistant thin single outermost protective layer.

Other objects and advantages of the present invention will appear from the further description and drawings.

According to the present invention a process for the production of a heat-mode recording material having "direct read after write" (DRAW) capability and containing a heat-mode recording layer on a permanent support is provided, wherein said process comprises in consecutive order the steps of (1) forming a laminated web by laminating with heat and pressure to said recording layer a single adhesive layer or multiple layer assemblage carried by a web-type temporary support which layer or layer assemblage has a thickness not larger than 20 µm, and (2) separating said temporary support from said adhesive layer leaving said single adhesive layer through hardening as a protective element on said recording layer, or (2') separating said temporary support from said adhesive layer assemblage leaving said layer assemblage as a protective element on said recording layer through hardening of at least the outermost layer of the transferred layer assemblage.

The present invention further provides a direct-read-after-write (DRAW) recording material having on a permanent support a heat-mode recording layer, wherein said heat-mode recording layer adheres to a single outermost protective layer that has a thickness of at most 20 µm, or adheres to a multiple layer assemblage that has a total thickness of at most 20 µm and of which the outermost layer being a protective layer has been chemically hardened by means of heat and/or ultraviolet radiation or electron beam radiation, and said outermost protective layer has at 20° C. a scratch resistance value not lower than 6 g determined by ANSI test PH1.37-1977 Method A using in the scratch test a single spherical point sapphire stylus having a point diameter of 13 micron.

ANSI is the acronym for American National Standards Institute, Inc. and is a registered tradename). The ANSI test PH1.37-1977 Method A is a test in the group of—Methods for Determining the Scratch Resistance of Processed Photographic Film. The standard test is intended for evaluating the scratch resistance of dry, processed photographic film on either the emulsion or the base side.

Method A operates with a scratch test apparatus described in said ANSI standard PH1.37-1977 in which a strip of the material to be tested held in a specimen holder is smoothly, linearly and horizontally travelled underneath a single spherical point sapphire stylus having in the applied test conditions a point diameter of 13 micron. The sapphire stylus is mounted at the end of a pivotable arm so that it can be lowered onto the specimen and thereby scribe a line on it when the specimen holder travels along under the stylus. The stylus should make perpendicular contact with the specimen.

The stylus arm is counterbalanced so that it produces no load on the stylus. The weights forming the load for scratching are applied with their center of gravity directly over the stylus. These weights range from 1 to 100 grams. Following the applied test procedure parallel lines are formed with different load going upward pro line by 1 g.

The formation of a scratch at a certain load is assessed visually. The rating of the scratch resistance is taken as the load in grams that produces the first visible scratch.

4. DETAILED DESCRIPTION OF THE INVENTION

According to a preferred embodiment of the present invention the production of a heat-mode recording material having DRAW capability includes the step of coating a heat-mode recording layer by "vacuum evaporation" which aptly applies to a process involving the vaporization of bulk material, e.g. molten metal, and redeposition thereof as a thin layer on a web-type support under substantially reduced pressure.

According to another embodiment vacuum-coating of a heat-mode recording layer of a DRAW recording material proceeds by "sputtering". Sputtering involves the production of energetic particles by ionization of a gas (usually argon at reduced pressure) and the bombardment with said particles of the target material in an electric field whereby the ejection of target atoms towards the web-type support takes place.

The adhesive layer or multiple layer assemblage forming a protective element according to the present invention is preferably transparent in such a degree that it allows visual inspection therethrough of the image information contained in the heat mode-recording layer and is for application as a printing mask or phototool sufficiently transparent with respect to ultraviolet light to allow ultraviolet radiation to be used in contact-exposure towards an underlaying UV-sensitive recording material such as a polymeric photoresist material.

The thickness of the applied single adhesive layer or total thickness of said multiple layer assemblage is preferably in the range of 0.1 to 15 µm, more preferably in the range of 1 to 10 µm.

Figure 1:
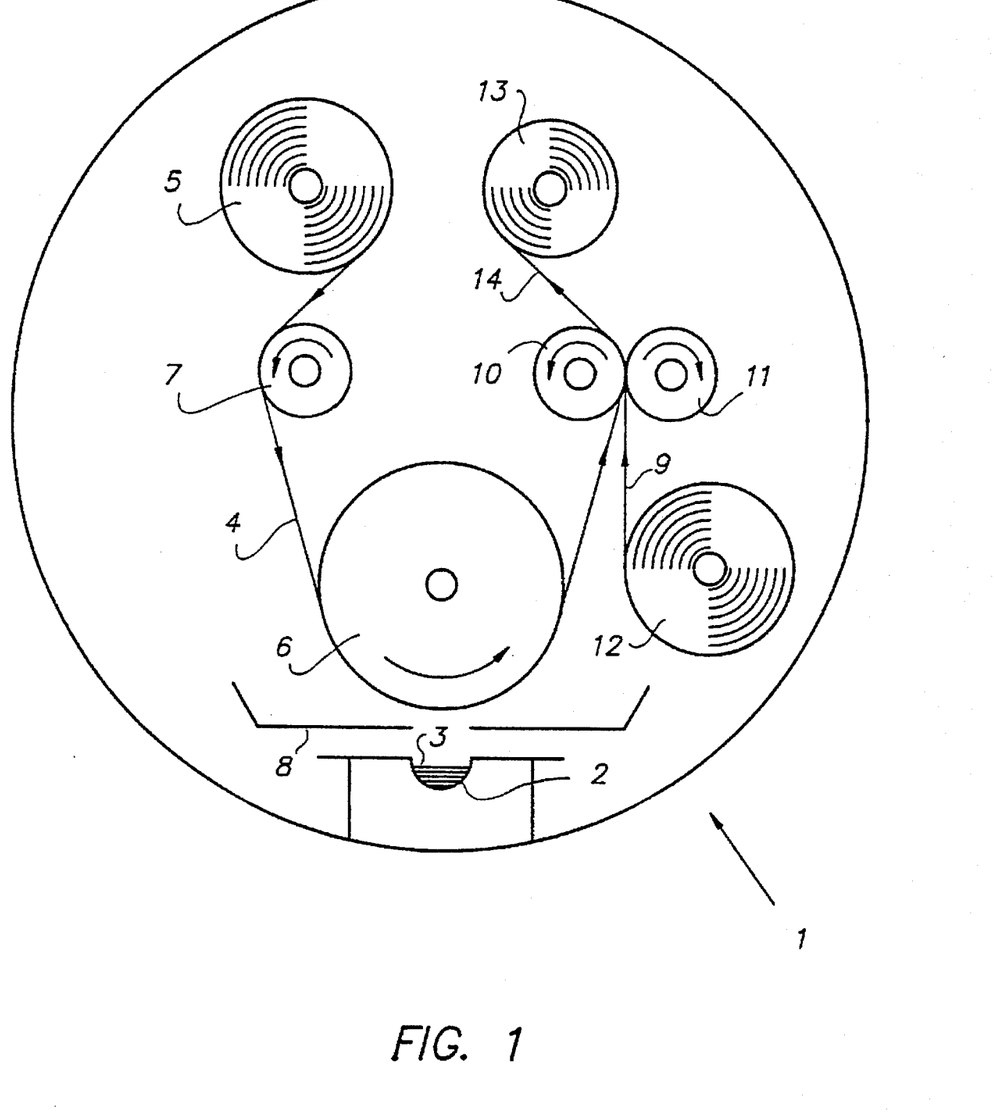
FIG. 1 represents a cross-sectional view of a vacuum-deposition apparatus including a lamination unit for carrying out step (1) of the process according to the present invention.
Figure 2:
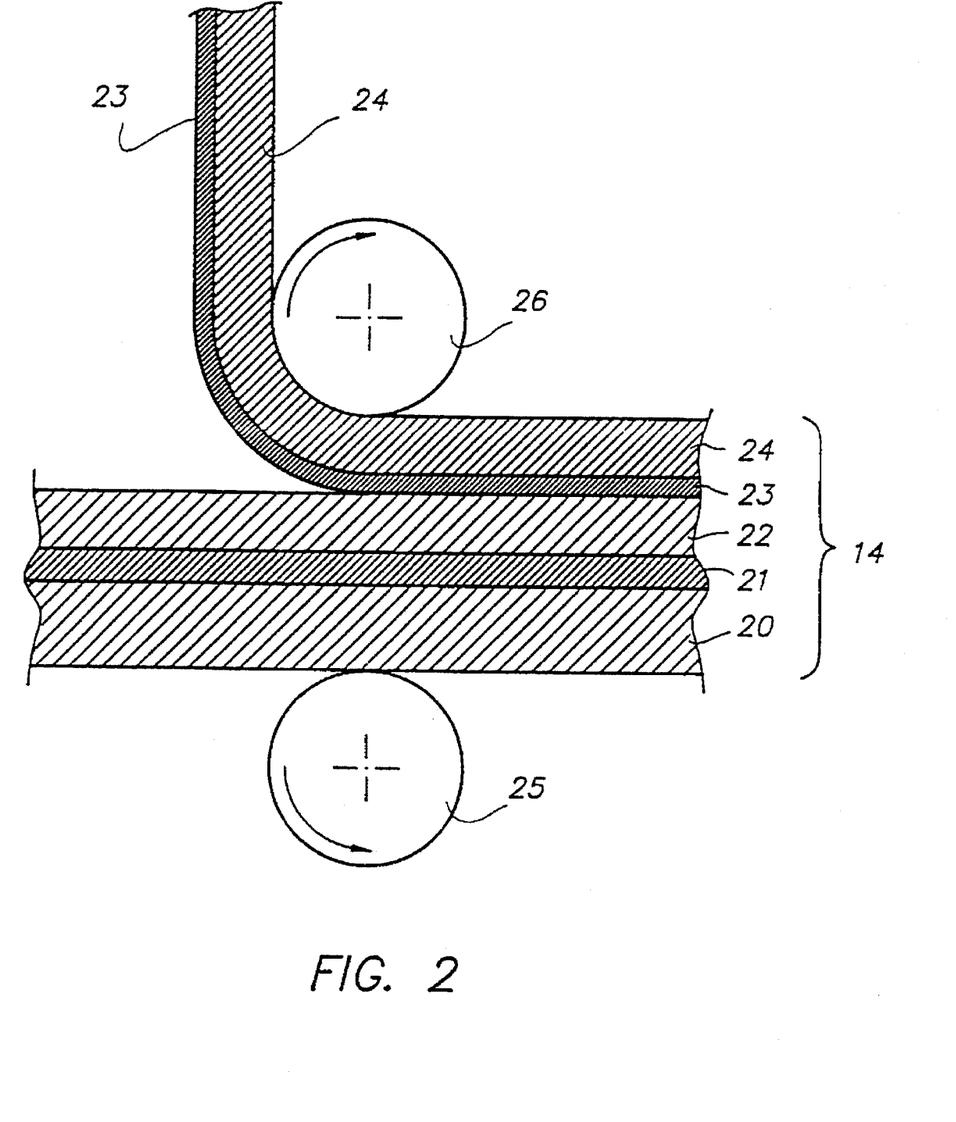
FIG. 2 represents schematically a peel-apart procedure for carrying out step (2) of the process according to the present invention.

The invention is illustrated by means of FIG. 1 and 2.

Referring to FIG. 1 a cylindrical vacuum chamber 1 contains an electrically heated refractory tray or boat 2 in which a relatively low melting metal, e.g. bismuth, 3 is present as metal vapour source. Under high vacuum (e.g. at a pressure in the range of 10–2 Pa to $8 \times 10^{-1}$ Pa) the obtained metal vapour is directed towards a web 4 made of polyethylene terephthalate and is deposited thereon at a thickness in the range of 5 nm to 300 nm. The optical density of the bismuth layer can be in the range of 1.5 to 4 according to the intended use of the lateron heat-mode formed bismuth image. The web 4 is supplied by an unwinding roll 5 and is conveyed over a guiding roller 7 against a cooled support roller 6. A baffle 8 restricts the vapour deposition on the web 4 to a small sector of the cooling roller 6. In that way unwanted deposition of metal e.g. on the wall of the vacuum chamber is prevented. After passing the zone of the metal vapour deposition the web 4 travels upwardly to meet a laminating web 9 (composite material of adhesive layer, release layer and temporary support) supplied by supply roller 12 in the nip formed between a pressure roller 10 that exerts pressure towards a backing roller 11 that is internally heated. A take-up roller 13 serves as storage roller for the laminated web material 14 having in this stage the temporary support as outermost layer.

Out of the vacuum chamber 1 the temporary support together with its release layer is removed (peeled apart) and the bared adhesive layer now being the outermost layer is cured optionally by further applied heat, (i.e. thermally chemically cured) or by electron beam or ultraviolet radiation. Thereupon the heat-mode recording web is cut into micro-film formats, e.g. micro-rich format, optical floppy disks or sheets for contact-exposure purposes, e.g. for the production of a phototool.

As illustrated in U.S. Pat. No. 5,147,490 the peel apart step in which the temporary support is removed can be carried out under the vaccum conditions present during the coating of the heat-mode recording layer.

FIG. 2 represents schematically a peel-apart procedure whereby an outermost single protective adhesive layer is left on a vacuum-coated metal recording layer of a head-mode DRAW recording material taken from the supply roller 13 of FIG. 1. For clarity's sake some dimensions and proportions of the recording material layers have been exaggerated. FIG. 2 shows a laminated web 14 consisting of a permanent resin support 20 vacuum-coated with a heat-mode recording layer 21, e.g. bismuth layer, an adhesive layer 22, release layer 23 and temporary support 24. Said web 14 is led in the nip of pressure rollers 25 and 26 and the temporary support 20 together with its release layer 23 is peeled apart leaving the adhesive layer 22 as outermost layer on the permanently supported metal layer 21 of the heat-mode recording material.

For information written by heat-mode recording and to be read in the transmission mode and for contact-exposure or projection purposes, e.g. for COM reproduction in the form of enlarged copies in a reader-printer, the recording layer is vacuum-deposited onto a transparent resin support. Representative resin supports are made of hard polymers, e.g. polyesters such as polyethylene terephthalate, polycarbonates, cellulose triacetate, poly(meth)acrylic esters, polyvinyl chloride and copolymers. These supports have e.g. a thickness in the range of 50 to 200 µm and are optionally provided with one or more subbing layers improving the adherence of the recording layer, as described e.g. in published European patent application 0 464 906 and/or are provided in contact with the heat-mode recording layer with a thermally deformable layer having a low softening point, e.g. a polyolefin layer such as polyethylene layer having preferably a thickness smaller than 10 µm. The presence of a soft deformable layer or elastomer layer in direct contact with the heat-mode recording layer is in favour of a more easy globule formation when an ablative metal or metal alloy, e.g. bismuth, forming the heat-mode recording layer is heated by laser beam. The globule-formation in heat-mode recording layers containing low melting-point metals and such layer having a low softening point has been described in Journal of Applied Photographic Engineering, Volume 9, Number 1, February 1983, p. 12.

The present invention includes an embodiment wherein the adhesive layer makes part of a multiple layer assemblage, e.g. bilayer-assemblage in which the layer contacting the heat-mode recording layer is made of a soft non-hardenable (non-curable) hot melt adhesive polymer having preferably a glass transition temperature lower than 30° C. and at least the layer forming lateron the outermost layer on the recording material is hardenable by heat (thermohardenable) and/or hardenable (curable) by ultraviolet radiation or electron beam radiation.

Polymers having a glass transition temperature (Tg) below 30° C. are known to those skilled in the art and some of them are described in Journal of Chemical Education, Vol. 61, Number 8, August 1984, p. 668 in the article "An Overview of the Glass Transition Temperature of Synthetic Polymers". Examples of such polymers are selected from the group consisting of a polyolefin, e.g. polyethylene or poly(1-butene), an ethylene-vinylacetate copolymer, an ethylene-acrylic acid(ester) copolymer, a styrene-butadiene copolymer, a polyamide or polyester having aliphatic carbon chains, e.g. poly(ethylene adipate).

The temporary support of the heat-mode recording material according to the present invention may be made of the same material as the permanent support but is preferably coated with a release layer allowing the easy peel-off of the adhesive layer.

The release layer may be made of e.g. of substances selected from the group consisting of solid waxes, polyvinyl alcohol, silicone resins and higly fluorinated resins, examples of which are described in U.S. Pat. No. 4,059,768 or may contain said substances serving as release agent preferably in excess of 30% by weight in a film forming polymer adhering to the temporary support. In a particular embodiment the release agent applied in a polymeric binding agent is a silicone oil that may be hardened to some extent as described e.g. in European patent specification 0 133 012. Some silicone oil of said release layer may remain as friction-lowering substance on the adhesive layer after its peel apart from the temporary support.

The thickness of the release layer is preferably in the range of 0.3 to 5 µm. The release layer may contain a curable composition and curing thereof proceeds preferably before coating thereon the adhesive layer. For example, a polyvinyl alcohol release layer applied on a temporary polyethylene terephthalate support is prehardened by crosslinking with tetramethoxysilane (TEMOS).

The adhesive layer for use according to the present invention must adhere very well to the heat-mode recording layer, e.g. a bismuth layer. The adhesive layer must be sufficiently transparent in the sense as already defined and may not stick (after hardening e.g. by cooling) to the rear side of the permanent support when winding the finished recording material.

Suitable single adhesive layers are made of e.g. a poly(meth)acrylate ester, e.g. butyl methacrylate and copolymers thereof with styrene, cellulose nitrate, and polymer compositions that are chemically hardenable by heat, i.e. are thermosetting, or are hardenable by ultraviolet radiation or electron beam radiation as described e.g. in published EP-A 0 522 609.

The hardening of the outermost single adhesive layer, e.g. by cooling or polymer-curing, proceeds after the lamination step and before the peel apart step in order to avoid sticking of that layer to the rear side of the recording material on winding. When applying a multiple layer asemblage having no outermost sticky layer the chemical hardening of the adhesive layer contacting the heat-mode recording layer may proceed before as well as after the peel apart step.

In order to improve the scratch resistance of a layer forming an outermost protective element anti-friction agents are incorporated into the outermost layer composition in the form of waxes, fluorine- or phosphate-containing surfactants and slipping agents such as siloxanes (silicones in liquid or solid form), higher fatty acids or salts thereof, e.g. zinc stearate, or silica or silicates having an average particle size in the range of 1 to 10 μm. Preferred in that respect without impairing too much the transparency of the adhesive layer are silica particles and colourless silicate particles, e.g. mica, calcium silicate, aluminium silicate, talc (magnesium silicate) partially protruding from the outermost protective layer.

After removing the temporary support and leaving the single adhesive layer or adhesive multiple layer assemblage on the heat-mode recording layer the obtained outermost surface of the recording material may be post-coated with a supplementary covering layer improving scratch resistance. Such coating having preferably a thickness not larger than 10 μm may be applied by spraying. Said coating may consist of or comprise a slipping agent as described above, e.g. a silicone oil or a fatty acid.

The coating composition of the adhesive layer or adhesive layer of the multiple layer assemblage may be applied by any thin-layer coating technique known in the art, e.g. by reverse roll coating or meniscus coating or slide hopper coating for the multiple layer assemblage using a proper vapourizable organic solvent for the applied polymer(s). The polymer(s) may be applied from aqueous medium in latex form, i.e. dispersed form, and coalesce on drying. For coating the multiple layer assemblage the coating may proceed in multiple coating steps, in which the polymer layer having a low softening point may be applied by extrusion. Optionally the coating or coatings is (are) followed by stretching the coated structure in order to reduce the total layer thickness.

According to a particular embodiment photo-curable (UV-curable) or electron beam curable polymers are coated from aqueous medium as a solution or dispersion.

Photo-curable and electron beam curable polymer compositions are advantageously applied in the form of a solution of polymers in monomers polymerizing in situ after coating.

According to an embodiment the adhesive layer is made from a radiation-curable composition containing as primary components:

(1) at least one reactive (pre)polymer or oligomer, (2) optionally at least one reactive solvent monomer dissolving (1), (3) in the case of an UV curable formulation a photoinitiator.

In said composition (1) the reactive (pre)polymer or oligomer is a compound containing one or more ethylenically unsaturated groups. Reactive polymers containing ethylenically unsaturated groups are commercially available from BOMAR Specialities Company under the tradename of JAYLINK (modified cellulose polymers containing acrylamidomethyl groups).

These reactive (pre)polymers or oligomers (1) are present in said composition preferably in a 10 to 100% by weight ratio and said reactive solvent in a 0 to 10% weight ratio.

When present the photoinitiator having UV-absorptivity is used in a concentration as low as possible, e.g. in a concentration of 0.1 to 1% by weight ratio with respect to the total coating composition. Preferably photo-bleachable photoinitiators are used.

Examples of suitable prepolymers for use in a radiation-curable composition of the adhesive layer applied according to the present invention are the following:

unsaturated polyesters, e.g. polyester acrylates; urethane modified unsaturated polyesters, e.g. urethane-polyester acrylates. Liquid polyesters having an acrylic group as a terminal group, e.g. saturated copolyesters which have been provided with acryltype end groups are described in published EP-A 0 207 257 and Radiat. Phys. Chem., Vol. 33, No. 5, 443–450 (1989).

Copolyesters substantially free from low molecular weight, unsaturated monomers and other volatile substances are of very low toxicity (ref. the periodical Adhäsion 1990 Heft 12, page 12). The preparation of a large variety of radiation-curable acrylic polyesters is given in German Offenlegungsschrift No. 2838691. Mixtures of two or more of said prepolymers may be used.

Further polymers suited from use in radiation (UV or EB) curable compositions are selected from the group consisting of unsaturated urethane(meth)acrylates, epoxy(meth)acrylates, polyether(meth)acrylates and polyester(meth)acrylates as described e.g. in "Chemistry & Technology of UV and EB formulation for coatings, inks and paints" Vol. 2: Prepolymers and Reactive diluents for UV and EB curable formulations." Ed. P. K. T. OLDRING-SITA Technology-London (1991).

A survey of UV-curable coating compositions is given e.g. in the periodical "Coating" 9/88, p. 348–353.

Other UV-curable adhesive layers can be obtained by the use of prepolymers also called oligomers of the class of aliphatic and aromatic polyester-urethane acrylates. The structure of polyester-urethane acrylates is given in the booklet "Radiation Cured Coatings" by John R. Constanza, A. P. Silveri and Joseph A. Vona, published by Federation of Societies for Coatings Technology, 1315 Walnut St. Philadelphia, Pa. 19107 USA (June 1986) p. 9.

The chemical structure of particularly useful aromatic polyester-urethane acrylate prepolymers is illustrated by following general formula:

wherein R is a C2 to C6 alkylene group.

In the synthesis of said aromatic urethane first tolylene 2,4-diisocyanate is used in a polyaddition reaction with aliphatic diols and the polymerizable double bond end structures are introduced by reaction of terminal isocyanate groups with 2-hydroxyethyl acrylate. In the synthesis of aliphatic urethane acrylates an alkylene diisocyanate is used, e.g. 1,6-diisocyanatohexane.

Examples of the preparation of aliphatic polyester-urethane acrylates, are given in U.S. Pat. No. 4,983,505 and in DE 2530896.

The introduction of a plurality of acrylic double bonds per polymer chain of the prepolymer proceeds by first effecting a partial esterification of a polyol, e.g. pentaerythritol, with acrylic acid and a subsequent reaction of the still free HO-group(s) of the polyol with a polyfunctional isocyanate.

Suited for use according to the present invention in pressure-sensitive curable adhesive layer compositions are ultraviolet cured pressure sensitive adhesives of the class of I. Acrylate Grafted Polyvinyl Alkyl Ethers and II. Monoacrylate Grafted Polyethers are described in Journal of Radiation Curing, Vol. 9/No. 2 April 1982.

The UV or EB curable coating composition may contain inert polymers by which is meant polymers that do not crosslink but improve by their inherent hardness the scratch resistance of the protective layer and counteract sticking to the rearside of the recording material when winding up. For that purpose are mentioned e.g. polyesters derived from aromatic acids, e.g. iso-, or terephhtalic acid, poly(meth)acrylate esters of C1-C4 alcohols, e.g. n-butyl methacrylate, and copolymers thereof with styrene and polyvinyl acetate.

Thus, according to a particular embodiment the adhesive layer is coated on its temporary support, preferably provided with release layer, from a coating composition essentially consisting of (an) addition polymerizable monomer or mixture of such monomers having dissolved therein at least one of the polymers (i) and/or (ii), wherein:

i) is a linear copolyester of isophthalic acid and at least one other dibasic carboxylic acid with an aliphatic diol, said copolyester being soluble in methyl methacrylate for at least 10 g per 100 ml at 20° C., and/or (ii) is a linear polyester of terephthalic acid and/or isophthalic acid with an oxyalkylated bisphenol, said polyester being soluble in methyl methacrylate for at least 10 g per 100 ml at 20° C., and wherein said composition comprises said monomer(s) acting as solvent(s) for polymers (i) and/or (ii) in a 20 to 70% by weight ratio with respect to the totality of said polymer(s) and monomer(s).

According to a preferred embodiment the above resins (i) and (ii) have a softening point (ring & ball) not lower than 90° C. The ring & ball method for determining the softening point is described in: Annual Book of ASTM Standards (1985), Vol. 06.03, p. 1031–1037.

The polymers (i) and (ii) have preferably a tensile strength of at least 30N/mm$^2$. determined by (for the applied testing machine reference is made to G. A. Patfoort "Polymers" An Introduction to their Physical Mechanical and Rheological Behaviour-(1974)-E. Story-Scientia P.V.B.A. Scientific Publishers Gent/Belgium, p. 134–136.

The weight-average molecular weight (Mw) determined by gel-permeation chromatography (GPC) of said polymers (i) and (ii) is preferably comprised between 10,000 and 30,000.

Preferred copolyesters (i) have an isophthalate content of at least 30% by weight.

Preferred dibasic acids that are combined with isophthalic acid in the formation of copolyesters (i) are C4–C10 dibasic acids, e.g. terephthalic acid and sebacic acid.

Examples of diols that may be used in the preparation of said copolyester (i) are: ethylene glycol, 1,4-butanediol, neopentyl glycol and 1,6-hexanediol, which diols may be used in combination.

Copolyesters (i) can be easily prepared by well-known polycondensation processes and representatives of them are commercially available under the tradename VITEL, e.g. VITEL PE 200 of the firm The Goodyear Tire & Rubber Co, Ohio, U.S.A, and are likewise commercially available in the group of Dynamit Nobel Chemicals under the tradename DYNAPOL of Hüls Aktiengesellschaft, Postfach 1320—D-4370 Marj, Germany. An example of the preparation of such copolyesters is described in U.S. Pat. No. 4,078,108.

The alkoxylated bisphenol used in the preparation of said polyesters and copolyesters (ii) is preferably within the scope of the following general formula:

wherein:

Y represents an alkylidene group having from 1 to 4 C-atoms, Z represents an oxyalkylene group wherein the alkylene group has 2 to 4 C-atoms, and m and n are integers 1 to 2. Preferred are ethoxylated and/or propoxylated bisphenol A compounds wherein bisphenol A stands for bis (4-hydroxyphenyl)-2,2'-propane.

Suitable propoxylated bisphenol A polyesters are on the market under the trade name ATLAC KTR 2300 and KTR 2959 of Atlas Chemical Industies N.V. (Everslaan 45, Everberg-Belgium).

The preparation of polyesters using an alkoxylated bisphenol is described e.g. in GB-P 1,373,220.

Adhesive layers having particularly good adherence to a vacuum-coated bismuth layer are obtained by means of coating compositions wherein the above polymers (i) and/or (ii) are dissolved in the range of 30 to 70% by weight at 20° C. in the addition polymerizable liquid monomer(s) acting as solvent(s).

The use of said polymerizable liquid monomers polymerizing in situ in the coating makes it possible to dispense with organic solvents that have to be removed from the coated adhesive primer layer composition.

The addition polymerizable monomers may be monofunctional or plurifunctional by which is meant that they may contain one or more olefinically unsaturated groups. Examples of monofunctional addition polymerizable liquid monomers that may serve as solvent for the above defined polymers (i) and (ii) are the following: methyl (metha) acrylate, ethyl acrylate, butyl acrylate, 2-ethylhexyl methacrylate, 2-hydroxyethyl acrylate, 2-hydroxyethyl methacrylate, glycidyl methacrylate, n-hexyl acrylate, lauryl acrylate, and tetrahydrofurfuryl methacrylate.

Preferred mono-functional monomers for use according to the present invention are methyl methacrylate and tetrahydrofurfuryl methacrylate.

Examples of suitable di-functional monomers are: 1,6-hexanediol diacrylate, 1,6-hexanediol dimethacrylate, neopentylglycol diacrylate, 1,4-butanediol diacrylate, ethyleneglycol diacrylate, polyethyleneglycol diacrylate, pentaerythritol diacrylate, divinylbenzene.

Acrylate 1,6-hexanediol diacrylate being a very good solvent for the applied resins (i) and (ii) is used preferably.

Examples of suitable tri- or more-functional monomers are: trimethylolpropane triacrylate, trimethylolpropane trimethacrylate, pentaerythritol triacrylate, dipentaerythritol hexaacrylate, an acrylate of ethylenediamine, aliphatic and aromatic urethane acrylates and the monomers according to general formula (I) described in non-published European patent application No. 91200468.6 filed Mar. 5, 1991, wherein reference is made for the preparation of said monomers to published German patent applications Nos. 3,522,005, 3,703,080, 3,643,216, 3,703,130, 3,703,080, 3,917,320 and 3,743,728.

When the radiation-curing is carried out with ultraviolet radiation (UV), a photoinitiator is present in the coating composition for forming the protective layer to serve as photo-radical former initiating the addition polymerization of the liquid monomers on UV-irradiation.

Photoinitiators suitable for use in photo-radical production belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethylbenzoate; acetophenone series compounds such as acetophenone, trichloroacetophenone, 1,1-dichloroacetophenone, 2,2-diethoxyacetophenone, 2,2-dimethoxy-2-phenylacetophenone; thioxanthone series compounds such as 2-chlorothioxanthone, 2-ethylthioxanthone: and compounds such as 2-hydroxy-2-methylpropiophenone, 2-hydroxy-4'-isopropyl-2-methylpropiophenone, 1-hydroxycyclohexylphenylketone; etc.

A particularly preferred photoinitiator is 2-hydroxy-2-methyl-1-phenyl-propan-1-one which product is marketed by E. Merck, Darmstadt, Germany under the tradename DAROCUR 1173.

The amount of the photoinitiator used is preferably within the range of 0.01 to 5 parts by weight relative to 100 parts by weight of the addition polymerizable monomer(s).

Apart from the above defined compounds the adhesive layer composition may contain additives playing a role in the coating stage or in the final layer. Examples of such additives are surfactants, solid lubricants, e.g. waxes, defoamers and anti-static agents.

Apparatus and methods for curing

Apparatus for radiation curing are known to those skilled in the art and are commercially available. When applying a photoinitiator in the primer layer composition the curing can proceed advantageously with ultraviolet radiation. For example, the curing proceeds with medium pressure mercury arc lamps or pulsed xenon arcs. These ultraviolet sources usually are equipped with a cooling installation, an installation to remove the produced ozone and a nitrogen inflow to exclude air from the surface of the product to be cured during radiation processing. An intensity of 40 to 120 W/cm in the 200–400 nm region is usually employed. An example of a commercially available ultraviolet source is IST supplied by Strahlentechnik, Oberboihingen, W. Germany.

High energy ionizing radiation such as X-rays, gamma rays, beta rays and accelerated electrons can also be used to accomplish curing of the coating. Typically, the radiation used should be of a sufficient intensity to penetrate substantially all the way through the coated layer. The total dosage employed should be sufficient to bring about curing of the radiation curable coating composition to form a solid layer.

UV radiation is better suited for non-pigmented or slightly pigmented systems having relatively thin films to allow full penetration of the irradiation.

When the protective layer has to possess high UV transmittance it is advantageous to work without UV absorbing photoinitiator and to apply electron beam (EB) curing since therefor no photoinitiator is needed. The penetration power of electron beam radiation depends on the value of the electron accelerating voltage and on the absorption capacity of the coatings.

There are two types of electron beam accelerators: high energy scanner types and low energy linear-cathode types also called electrocurtain type accelerators. These accelerators are usually equipped with nitrogen inflow. A dose in the range of 0.01 to 10 megarads is employed. Examples of commercially available EB accelerators are PILOT 200 and CB175/60/380 both supplied by Energy Sciences Inc., Geneva, Switzerland. Electron beam curing is described e.g. in, the periodical Adhäsion 1990-Heft 12, pages 39–40. Curing periods of about 1 second duration are possible, especially in thin (10–20 micron) coatings.

Coating of the coating composition forming the protective layer proceeds advantageously by means of a coating technique known as silk screen printing.

When applying said coating technique the liquid coating composition of said adhesive layer preferably has at the coating temperature a viscosity of at least 450 mPa.s, the viscosity being measured at that temperature with a Hoeppler viscometer.

In the production of a heat-mode recording material having direct-read-after write capability bismuth has interesting properties. Vacuum-deposited bismuth yields a high optical density even in very thin (thickness smaller than 200 nm) layers. The optical density of such vapour-deposited bismuth layer can be reduced by flash light or laser beam exposure and bismuth adheres directly to an unsubbed polyethylene terephthalate support as has been mentioned already in GB-P 1,566,802.

The application of a thin bismuth film for DRAW recording is described in the periodical Optica Acta, 1977, vol. 24, No. 4, 427–431. The storage layer, i.e. the recording layer, described therein consists of a 60 nm bismuth layer and a Ge anti-reflex coating that prevents to a certain degree oxidation of the bismuth layer.

In order to obtain recording materials that are suited for the production of images that wholly or partly can be read-out in the reflection mode the recording layer, e.g. a black mat bismuth layer is applied on a reflective support or supported reflective interlayer, e.g. made of aluminium or containing a dispersion of white pigment, e.g. titanium dioxide in a polymeric binder, e.g. gelatin.

The present invention is illustrated by the following examples without however, limiting it thereto. All percentages and ratios are by weight unless otherwise mentioned.

EXAMPLE 1

On one side of a 63 μm thick polyethylene terephthalate film serving as temporary support a co(styrene/butylmethacrylate)(70/30) solution in methyl ethyl ketone was coated to form after drying a 6 μm thick adhesive layer.

The thus obtained film material was laminated through its adhesive layer in contact with a freshly in vacuum deposited bismuth layer. Said bismuth layer was deposited at a thickness of 0.3 μm on a 175 μm thick permanent polyethylene terephthalate resin support using the apparatus schematically represented in FIG. 1

The lamination proceeded at a temperature of 89° C. and lamination speed of 40 cm/min. Thereupon the laminated material was wound up on a collector roller that was removed from the vacuum chamber after restoring normal pressure.

The temporary support of the laminated material was peeled apart under ambient temperature conditions (about 20° C.) out of the vacuum chamber as shown in FIG. 2 leaving said adhesive layer as outermost protective layer on said bismuth heat-mode recording layer.

The scratch resistance of said outermost protective layer was measured as described hereinbefore and corresponded with a scratch resistance value of 6 g.

The transmission optical density of the obtained heat-mode recording material measured through said outermost protective recording layer with Macbeth densitometer type 904TD (provided with UV filter) was 3.53.

The heat-mode recording material was exposed scanningwise (38.8 m/s) to 1053 nm light of a commercial Nd:Ylf laser having a spot diameter $1/e^2=18$ μm and maximal exposure power of 1.7 W striking the recording layer. The transmission density obtained in a thus exposed large solid area was 0.24.

An adherence test carried out by tape (TESA type 4122 of 3M Co.) first pressure-stuck to said protective layer and abruptly torn off proved that the laminated protective covering layer remained undisturbed on the laser-beam exposed area as well as on the non-exposed area.

EXAMPLE 2

Example 1 was repeated with the difference that the temporary support was pre-coated with a release layer in the form of a 2 μm thich polyvinyl alcohol layer applied from an aqueous 5% polyvinyl alcohol solution of which the polyvinyl alcohol still contained 2% of unsaponified vinylacetate groups. The coating solution contained 0.05% of saponine as wetting agent. The in Example 1 described adhesive layer was coated onto said release layer.

In the peel apart step the release layer was easily removed together with the temorary support.

The same scratch resistance and adherence results as mentioned in Example 1 were obtained.

EXAMPLE 3

On one side of a 63 μm thick polyethylene terephthalate film serving as temporary support a solution in methyl ethyl ketone containing 8% of co(vinylchloride/vinyl acetate/maleic acid) (86/13/1) commercially available under the tradename VINYLITE VMCH from UNION CARBIDE, 1.82% of CYMEL 303 (tradename of CYANAMIDE for hexamethoxymethylmelamine, and 0.18% of CYCAT 600, tradename for a hardening catalyst available from CYANAMIDE was coated to form after drying a 6 μm thick heat-curable adhesive layer.

The thus obtained film material was laminated through its adhesive layer in contact with a freshly in vacuum deposited bismuth layer as described in Example 1.

The temporary support of the laminated material was peeled apart under ambient temperature conditions (about 20° C.) out of the vacuum chamber as shown in FIG. 2 and cured at 110° C. for 30 minutes.

The scratch resistance of said outermost protective layer was measured as described hereinbefore and corresponded with a scratch resistance value of 8 g.

EXAMPLE 4

On one side of a 63 μm thick polyethylene terephthalate film serving as temporary support a solution in methyl ethyl ketone containing 6.5% of co(styrene/butylmethacrylate (73/30), 2.0% of trimethylolpropane triacrylate (SARTOMER 351 tradename of CRAY VALLEY), 1.35% 1,1'-biimidazole-2,2'-bis(o-chlorophenyl)-4,4',5, 5'-tetraphenyl, 0.075% mercaptobenzoxazole and 0.075% Michler's ketone was coated to form after drying a 6 μm thick UV-curable adhesive layer.

The thus obtained film material was laminated through its adhesive layer in contact with a freshly in vacuum deposited bismuth layer as described in Example 1.

Thereupon outside the vacuum chamber UV-curing of the transferred UV-curable adhesive layer was carried out by means of a Labcure Unit (marketed by TECHNIGRAF GmbH, Grävenwiesbach, Germany) operating with air cooling, an energy supply of 80 W/cm at a throughput velocity of 2 m/min while maintaining the curable layer at a distance of 11 cm from the UV-radiation source.

Then the temporary support of the laminated material was peeled apart under ambient temperature conditions (about 20° C.) out of the vacuum chamber as shown in FIG. 2.

The scratch resistance of the UV-cured outermost protective layer was measured as described hereinbefore and corresponded with a scratch resistance value of 8 g.

EXAMPLE 5

On one side of a 63 μm thick polyethylene terephthalate film serving as temporary support a solution in methyl ethyl ketone containing 6.5% of co(styrene/butylmethacrylate (73/30), 2.0% of trimethylolpropane triacrylate (SARTOMER 351 tradename of CRAY VALLEY) was coated to form after drying a 6 μm thick EB-curable adhesive layer.

The thus obtained film material was laminated through its adhesive layer in contact with a freshly in vacuum deposited bismuth layer as described in Example 1.

The temporary support of the laminated material was peeled apart under ambient temperature conditions (about 20° C.) out of the vacuum chamber as shown in FIG. 2.

Thereupon EB-curing of the transferred EB-curable adhesive layer was carried out by means of an electron beam producing apparatus operating at 150 kV and radiation energy corresponding with 4 mGy at a travelling speed of the irradiated material of about 3 m/min.

The scratch resistance of said outermost protective layer was measured as described hereinbefore and corresponded with a scratch resistance value of 8 g.

EXAMPLE 6

On one side of a 63 μm thick polyethylene terephthalate film serving as temporary support was coated a solution in methyl ethyl ketone containing 6.5% of co(styrene/ butylmethacrylate (73/30), 2.0% of trimethylolpropane triacrylate (SARTOMER 351 tradename of CRAY VALLEY), 1.35% 1,1'-biimidazole-2,2'-bis(o-chlorophenyl)-4,4',5, 5'-tetraphenyl, 0.075% mercaptobenzoxazole and 0.075% Michler's ketone so as to form after drying a 6 μm thick UV-curable adhesive layer.

Onto said dried UV-curable layer an aqueous dispersion (latex) of co(butadiene/styrene/acrylic acid/acrylamide) (34/62/2.0/4.0), an elastomer marketed by BAYER AG Germany under the tradename BAYSTAL P VP KA8522, was coated so as to form a relatively soft adhesive layer having a dry coating coverage of 4 g/m².

The thus obtained film material was laminated through its adhesive layer in contact with a freshly in vacuum deposited bismuth layer as shown in FIG. 1.

Thereupon outside the vacuum chamber UV-curing of the UV-curable layer was carried out by means of a Labcure Unit (marketed by TECHNIGRAF GmbH, Gräavenwiesbach, Germany) operating with air cooling, an energy supply of 80 W/cm at a throughput velocity of 2 m/min while maintaining the UV-curable layer at a distance of 11 cm from the UV-radiation source.

Then the temporary support of the laminated material was peeled apart under ambient temperature conditions (about 20° C.) out of the vacuum chamber as shown in FIG. 2.

The scratch resistance of the thus cured outermost protective layer was measured as described hereinbefore and corresponded with a scratch resistance value of 8 g.

We claim:

1. A process for the production of a heat-mode recording material having "direct read after write" (DRAW) capability and containing a heat-mode recording layer on a permanent support, wherein said process comprises in consecutive order the steps of:

(1) forming a laminated web by laminating with heat and pressure to said recording layer a single adhesive layer or multiple layer assemblage comprising an adhesive layer and an outermost layer, said multiple layer assemblage and said single adhesive layer carried by a temporary support and in which said single adhesive layer or multiple layer assemblage has a thickness not larger than 20 μm;

(2) separating said temporary support from said single adhesive layer leaving said single adhesive layer as a protective element on said recording layer, or (2') separating said temporary support from said multiple layer assemblage leaving said multiple layer assemblage with the outermost layer as a protective element on said recording layer; and (3) chemically hardening said single adhesive layer or said outermost layer of said multiple layer assemblage after said separating step (2) or (2') by means of heat and/or by ultra-violet radiation or electron beam radiation, said hardening providing said single adhesive layer or said outermost layer of said multiple layer assemblage with a scratch resistant value at 20° C. not lower than 6 g determined by ANSI test PH1.37-1977 Method A using in said test a single spherical point sapphire stylus having a point diameter of 13 micron.

2. Process according to claim 1, wherein said heat-mode recording layer is coated on its permanent support under vacuum conditions, and said step (1) is carried out under the same vacuum conditions as wherein the coating of said recording layer on said permanent support took place.

3. Process according to claim 1, wherein the adhesive layer of said multiple layer assemblage contacting the heat-mode recording layer is made of a soft non-hardenable (non-curable) hot melt adhesive polymer having a glass transition temperature lower than 30° C. and at least the layer forming said outermost layer on the recording material is chemically hardenable by means of heat and/or by ultra-violet radiation or electron beam radiation.

4. Process according to claim 1, wherein the thickness of said single adhesive layer or the total thickness of said multiple layer assemblage is in the range of 1 to 10 μm.

5. Process according to claim 1, wherein said step (2) is carried out under vacuum conditions.

6. Process according to claim 1, wherein said steps (2) or (2') are carried out under non-vacuum conditions and in said steps (2) or (2') the laminated web obtained in step (1) is led in a nip of pressure rollers and an optional release layer attached to the temporary support is peeled apart from said single adhesive layer or said multiple layer assemblage on top of said heat-made recording layer.

7. Process according to claim 1, wherein said permanent support is made of a polymer selected from the group consisting of polyesters, polycarbonates, cellulose triacetate, poly(meth)acrylic esters, polyvinyl chloride and copolymers.

8. Process according to claim 1, wherein said permanent support has a thickness in the range of 50 to 200 μm and is optionally provided with one or more subbing layers to improve the adherence of said recording layer.

9. Process according to any of claims 1, wherein said temporary support is made of the same material as the permanent support.

10. Process according to claim 1, wherein said temporary support before carrying out said step (1) has been coated with an intermediary release layer for said single adhesive layer or multiple layer assemblage, and wherein said steps (2), (2') said intermediary release layer for said adhesive layer or multiple layer assemblage together with said temporary support is separated from said single adhesive layer or multiple layer assemblage.

11. Process according to claim 10, wherein said release layer is made of substances selected from the group consisting of solid waxes, polyvinyl alcohol, silicone resins and higly fluorinated resins or contains said substances serving as release agent in excess of 30% by weight in a film forming polymer adhering to the temporary support.

12. Process according to claim 11, wherein said release agent is a silicone oil.

13. Process according to claims 10, 11, or 12, wherein the thickness of said release layer is in the range of 0.3 to 5 μm.

14. Process according to claim 1 or 2, wherein said single adhesive layer or outermost layer of said multiple layer assemblage is made from a radiation-curable composition containing as primary components:

(1) at least one reactive (pre)polymer or oligomer,
(2) optionally at least one reactive solvent monomer capable of dissolving (1),
(3) optionally a photoinitiator.

15. Process according to claim 14, wherein said reactive (pre)polymers or oligomers (1) are present in said composition a 10 to 100% by weight ratio and said reactive solvent monomer(s) in a 0 to 10% weight ratio with respect to the totality of said composition.

16. Process according to claim 1, wherein the scratch resistance of the obtained protective element is improved by including in the protective element anti-friction agents in the form of waxes, fluorine or phosphate containing surfactants and inorganic slipping agents being silica or silicates having an average particle size of 1 to 10 μm partially protruding from the adhesive layer.

17. Process according to claim 1, wherein the heat-mode recording layer is a bismuth layer that has been coated onto said permanent support under vacuum conditions.

* * * * *

UNITED STATES PATENT AND TRADEMARK OFFICE
CERTIFICATE OF CORRECTION

PATENT NO. : 5,656,410
DATED : August 12, 1997
INVENTOR(S) : Van Damme et al.

It is certified that error appears in the above-identified patent and that said Letters Patent is hereby corrected as shown below:

Column 16, line 24, "any of claims 1" should read --claim 1--.

Signed and Sealed this

Twelfth Day of May, 1998

Attest:

BRUCE LEHMAN

Attesting Officer

Commissioner of Patents and Trademarks